Sept. 11, 1951          E. B. HUDSON          2,567,711
ROTARY POWER PLANT

Filed Oct. 29, 1946          6 Sheets-Sheet 1

Inventor
Edwin B. Hudson

By Samuel Lebowitz
Attorney

Inventor
Edwin B. Hudson
By Samuel Lebowitz
Attorney

Sept. 11, 1951  E. B. HUDSON  2,567,711
ROTARY POWER PLANT
Filed Oct. 29, 1946  6 Sheets-Sheet 4
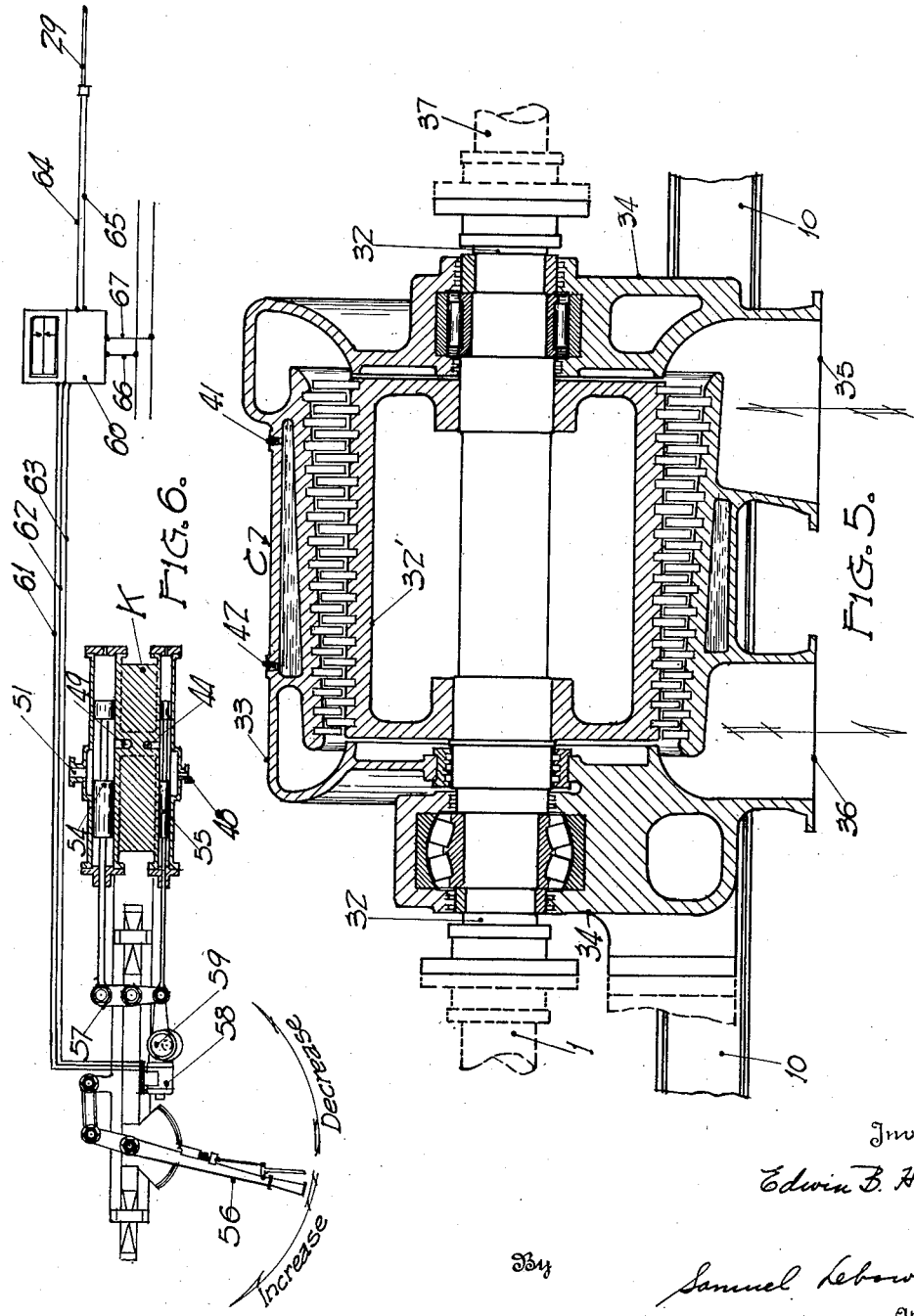
Inventor
Edwin B. Hudson
By
Samuel Lebowitz
Attorney Sept. 11, 1951      E. B. HUDSON      2,567,711

ROTARY POWER PLANT

Filed Oct. 29, 1946      6 Sheets-Sheet 5

Inventor
Edwin B. Hudson
By
Samuel Lebowitz
Attorney

Sept. 11, 1951  E. B. HUDSON  2,567,711
ROTARY POWER PLANT

Filed Oct. 29, 1946  6 Sheets-Sheet 6

Patented Sept. 11, 1951

2,567,711

UNITED STATES PATENT OFFICE 2,567,711

ROTARY POWER PLANT

Edwin B. Hudson, Middletown, Ohio

Application October 29, 1946, Serial No. 706,378

9 Claims. (Cl. 60—49)

This invention relates to a power plant installation embodying a vapor generator, a gas turbine and a vapor turbine and other auxiliaries which are designed and operated as an energy converter operating at maximum efficiency.

It is the object of the present invention to provide a power plant installation, including a rotary steam or other vapor generator, a combustion gas turbine and a steam or other vapor turbine, all of which units are mounted upon a common rotary shaft and rotate together. These units, as well as some of the auxiliaries associated therewith, are adapted to operate at high output capacities and with maximum efficiency to drive a load such as an electric generator or the like also mounted on the same rotary shaft.

It is the object of the invention to utilize combustion gases of high heat content formed by supercharged air with combustibles so that the high temperatures derived therefrom are absorbed by liquids disposed in heat-exchange relationship with respect thereto, giving rise to vapors at high temperatures and pressures which are designed to drive a prime mover in the form of a vapor turbine. In addition, the combustion gases are utilized to drive a gas turbine to extract the kinetic forces in such gases, while additionally extracting the thermal energy in said gases by increasing the efficiency of the vapor turbine and by transferring the heat therefrom to the incoming components of the combustion gases such as the fuel and air, as well as the incoming liquid.

It is a further object of the invention to provide an installation operating with supercharged combustion gases having high rates of heat release with maximum safety and efficiency as a result of the substantially straight path of the combustion gases in the course of their travel, the intimate intermixture of the components thereof by the rotary elements of the vapor generator, and the high degree of extraction of the latent heat energy therein even upon its exhaust from the vapor generator and gas turbine for use in the auxiliaries of the power plant installation. This safety factor is enhanced by the provision of a vapor generator of simple and rugged construction and which is self-regulating it its operation because a source of liquid is always assured for absorption of the heat of the combustion gases as a result of the centrifugal forces acting upon the incoming liquid tending to force the latter into heat exchange relation with the combustion gases.

It is a further object of the invention to provide a power plant installation embodying a rotary vapor generator characterized by a radial mounting of vapor generating tubes on a rugged rotary shaft construction which lends itself to easy maintenance and replacement. The tube arrangement not only assures an adequate supply of liquid for vaporization but also induces an effective separation of the generated vapors from the liquid constituents.

The assembly of the several elements of the power plant installation, including the auxiliaries, is such as to facilitate the maintenance and repair of the individual elements without requiring the break-down of the other components of the system.

It is another object of my invention to supply power at low cost, which is suitable for boats, ships, railway locomotives and electric power generating stations and capable of power uses now supplied by the diesel engine but at a lower cost per horse-power-hour. Since my invention is of a rotary type, similar to a turbine, it has no reciprocating parts or timing mechanism such as gears, cam shafts or other undesirable parts that require expensive maintenance or special lubrication.

Among the principal objects of my invention is the provision of a heat engine which is a self-contained machine capable of providing power from low cost fuels and having a thermal efficiency approaching or equal to that of a diesel engine and which, because of lower cost fuel, has a lower horse-power-hour cost. The turbine type construction of my invention reduces lubricating cost to a minimum as the only points of lubrication are the bearings.

Another object is the provision of a turbine type prime mover having virtually one moving part rotating about a common axis and devoid of all sliding surfaces such as pistons, timing apparatus such as gears and cam shafts.

Another object is the provision of a prime mover, a gas turbine, a steam turbine, a rotary air compressor either radial, axial or lobe, a combustor, a means of supply for fuel and water, a steam turbine and a rotary steam generator or boiler capable of producing large quantities of steam at suitable operating pressure, the moving elements all of which rotate about a common axis at the same rotational speed and operate as a single unit.

Another object is the provision of a prime mover having a binary-fluid cycle employing two fluids, mercury and water, in addition to the products of combustion which are absorbed by a gas turbine, a mercury vapor turbine, a mercury-condenser-steam boiler combination, a steam turbine, a steam condenser, a rotary mercury-vapor generator or boiler of high evaporating capacity, said boiler being supercharged for burning of the fuel, insuring a higher B. t. u. release, the moving parts all of which rotate at the same speed about a common axis and operate as a unit.

Another object is to provide a prime mover which is capable of using low cost fuels such as light oils, crude oil, residual oils, natural gas, coke oven gas, blast furnace gas, pulverized coal or pulverized coal and oil in combination or any fuel suitable and which can be burned in fuel burners under relatively high air pressure, i. e., 40-125 p. s. i., insuring high B. t. u. release as compared to burning fuel at or near atmospheric pressure in the conventional boiler.

Another object is to provide means to reach combustion temperatures as high as 2500° F. or higher, having a boiler evaporating capacity in excess of 100,000 B. t. u. per square foot per hour, considerably above that realized in conventional boiler design.

Another object is to provide a rotary boiler in which the feed water or mercury is supplied at or near atmospheric pressure while the vapor pressure is in the pressure range used for power production in conventional power plants; such pressures that may be desired can be realized by proper proportioning of the boiler and rotational speed.

Another object of my invention is the provision of a rotary boiler operating at higher combustion temperatures than is normally realized in conventional boilers, having high evaporating capacity and having the unusual characteristics that the feed water or mercury enters the boiler as required at or near atmospheric pressure automatically, without any special devices or apparatus to insure that the demand is maintained while at the same moment the vapor pressure is within the range required for the development of power. The rotation of the boiler simulates the action of a centrifugal pump which in this case the vapor pressure represents the head or pressure against which the pumping action operates and as evaporation occurs additional liquid is supplied by suction to maintain equilibrium between the centrifugal forces acting upon the liquid supplied to the boiler and the generated vapor pressure.

Other objects of my invention are the provision of a prime mover of a simple and effective design having all the good characteristics of a turbine machine and capable of supplying low cost power that cannot be equalled in cost when low cost fuels such as residual oil or pulverized coal are used.

As the metallurgical development of suitable alloys for gas turbine blades has not progressed to a point where it is safe to operate above 1300° F., I have provided automatic protective control to insure that any predetermined temperature is not exceeded.

The mercury, steam, gas turbine as described is particularly suited for railway locomotives where treated water is not available, for in this arrangement only mercury is used in the supercharged rotary boiler and the water only enters the mercury condenser and steam boiler which is easily washed out or replaced when it becomes ineffective.

Other objects and purposes will appear from the detailed description of the invention following hereinafter, taken in conjunction with the accompanying drawings, wherein Fig. 1 shows the general layout of a gas-steam turbine with rotary boiler, combustor blower, electric generator and auxiliaries;

Figure 2:
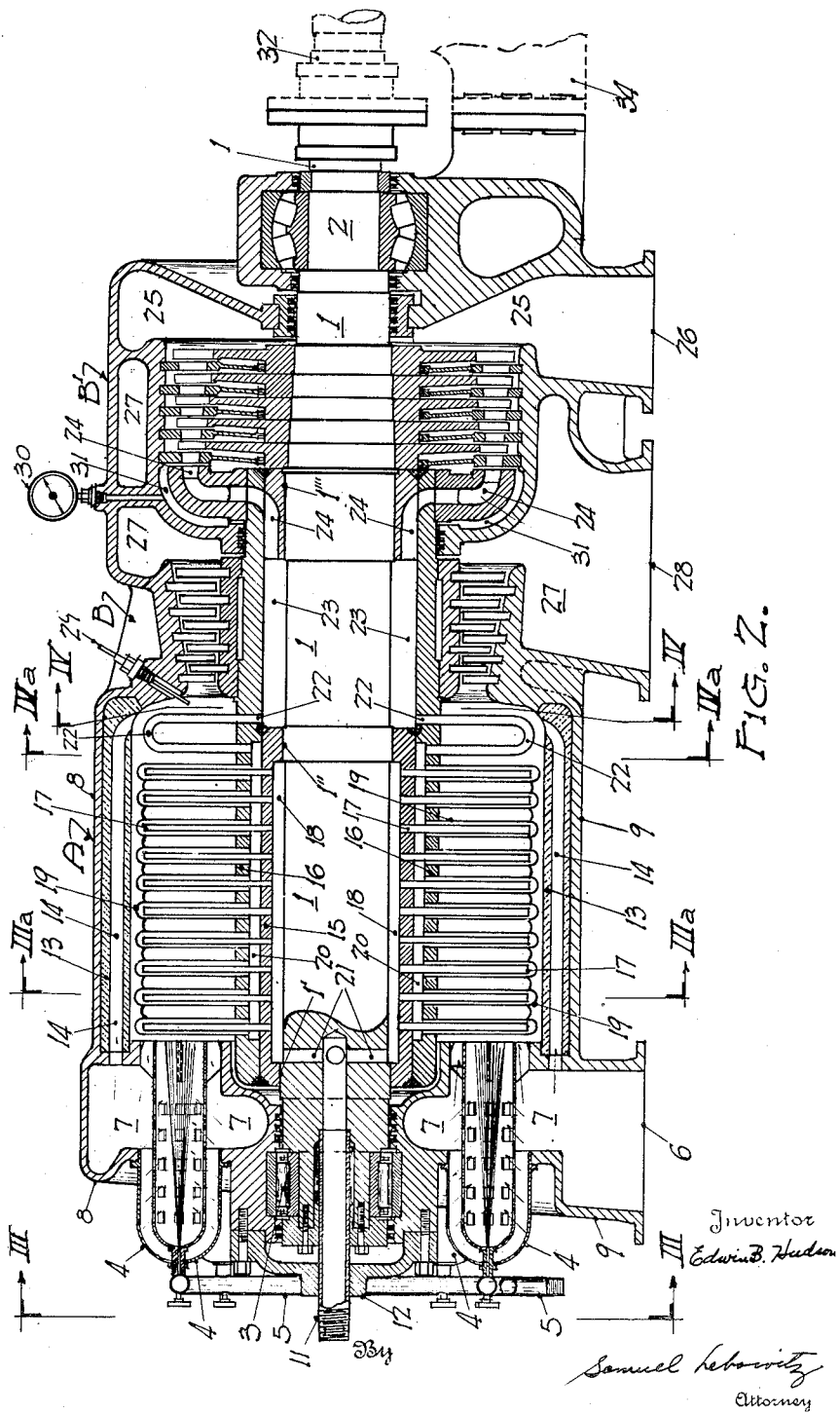
Fig. 2 is a longitudinal section through rotary boiler, gas turbine and steam turbine.
Figures 3, 3A:
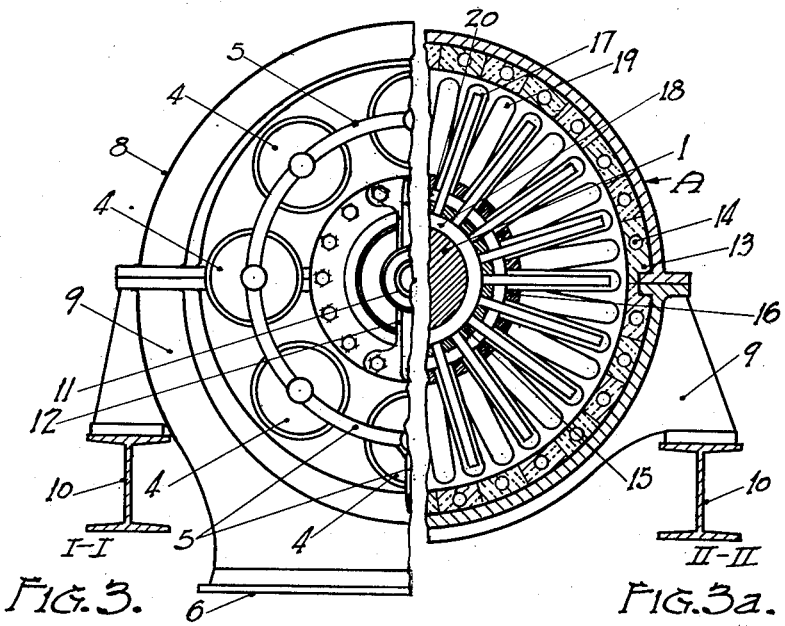
Fig. 3 shows a partial left end view of boiler showing burners at section III—III of Fig. 2.
Figures 4, 4A:
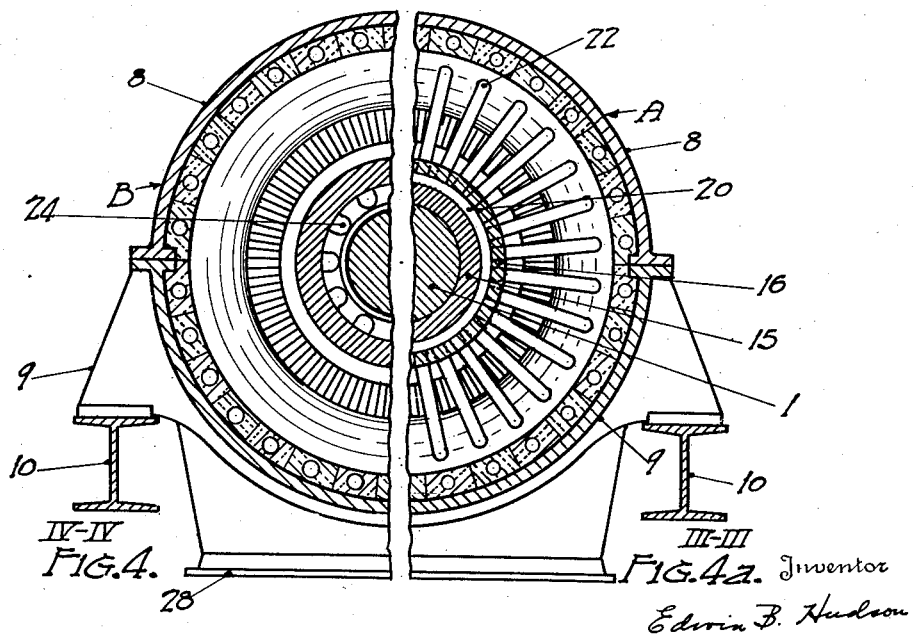
Figure 8:
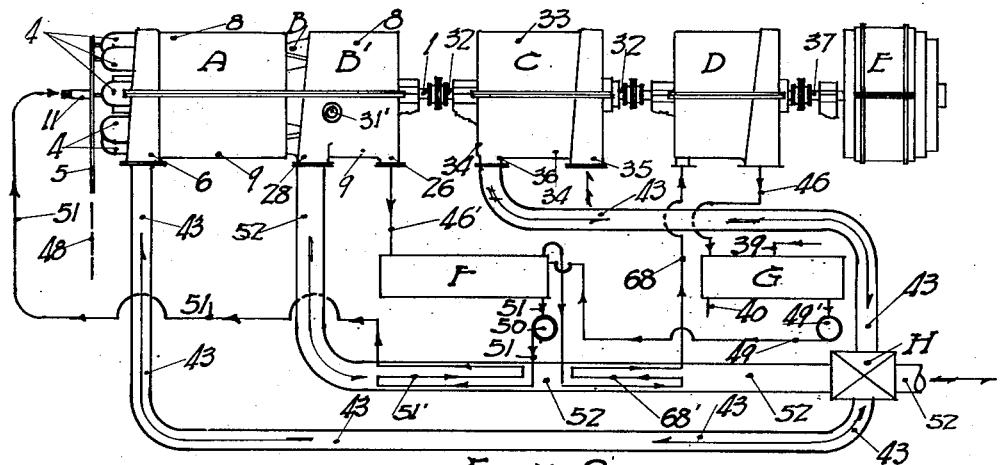
Figures 7, 9:
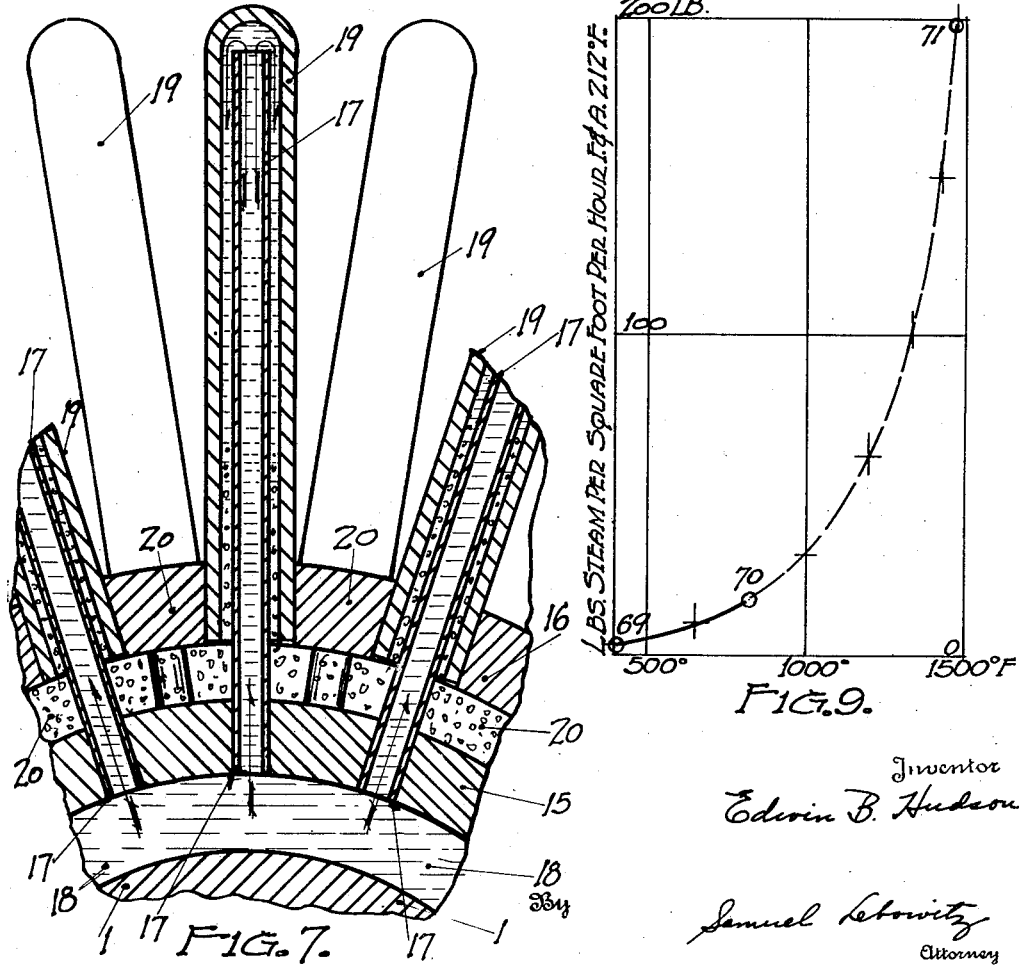
Figure 10:
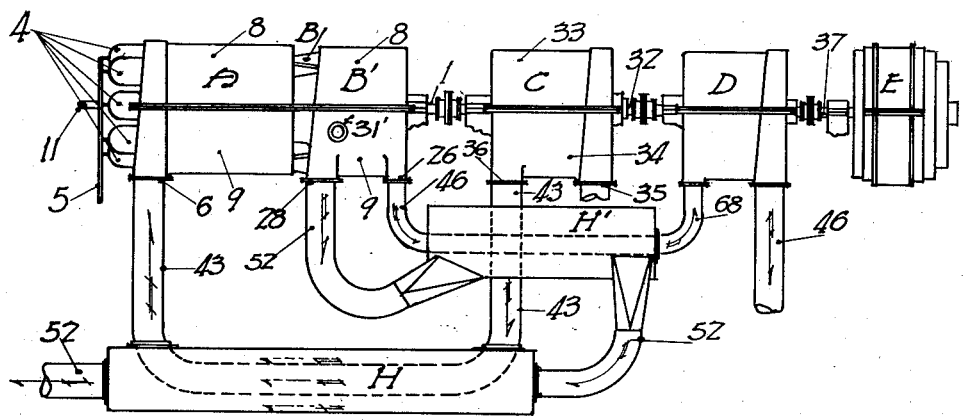

Fig. 3$a$ shows a partial sectional view across the boiler at lines III$a$—III$a$ of Fig. 2;

Fig. 4 shows a partial sectional view along line IV—IV of Fig. 2;

Fig. 4$a$ shows a partial sectional view along line IV$a$—IV$a$ of Fig. 2;

Fig. 5 is a longitudinal sectional view through the axial air compressor;

Fig. 6 shows the fuel and liquid (water or mercury) control valve, and automatic means for controlling the gas temperature entering the gas turbine;

Fig. 7 shows an enlarged transverse partial view through the rotary boiler tubes;

Fig. 8 shows the schematic arrangement of a gas, mercury, steam power generator together with axial air compressor, steam turbine, electric generator and auxiliaries of another embodiment of the invention;

Fig. 9 is a chart showing estimated water evaporating rate at the various flue gas temperatures; and Fig. 10 shows a schematic arrangement of a gas steam generator together with axial air compressor, steam turbine, electric generator and auxiliaries of another embodiment of the invention.

In order to simplify the description of my invention I have indicated the principal units by letters, the details being described by numbers.

The principal parts with their letters are:

A. Rotary boiler utilizing either water or mercury as the vaporizable medium.

B. Gas turbine.

B'. Vapor turbine—mercury turbine or steam turbine.

C. Axial air compressor.

D. Steam turbine (Fig. 8).

E. Electric generator.

F. Mercury condenser and steam generator combination (Fig. 8).

G. Steam condenser.

H. Heat exchanger or reheater.

J. Air precooler.

K. Proportioning control valve.

I shall now describe the principal unit of my invention that makes this method of producing power possible, which is a combustor, a rotary boiler, a gas turbine, a vapor turbine (steam or mercury vapor). The combustor and rotary boiler is unit A, the gas turbine is unit B and the steam or mercury vapor turbine is B'. These three principal units are mounted on a common shaft 1, supported by bearings 2 and 3, as shown.

The combustor or vapor generator consists of eight or more burners 4, which are supplied with fuel oil under pressure by manifold 5. Preheated air is supplied under pressure through connection 6 to annular space 7 which surrounds all burners 4 as shown. The surrounding structure is parted along the center line of the shaft, the upper half is indicated by 8 and the lower half by 9, which is supported by girders 10 which support all the units having rotating parts (Figs. 3-4). Water or mercury is supplied to the rotary boiler through non-rotating feed pipe 11, supported by bracket 12. A suitable stuffing box is provided as shown.

Figure 1:
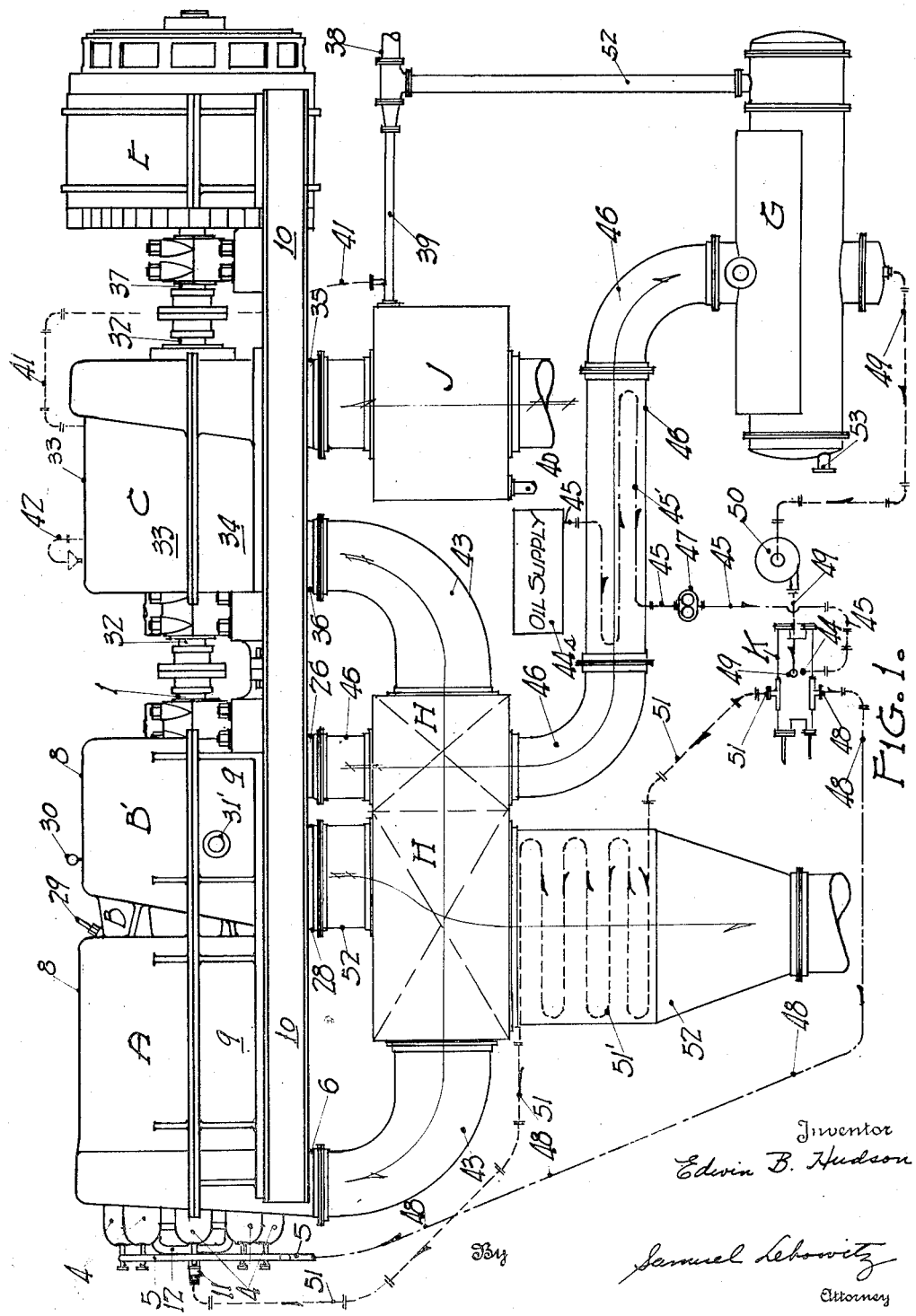

The boiler portion of the casing 8 and 9 is lined with a refractory jacket 13, with air cooling vents or holes at 14. The boiler consists of two sleeves fabricated as shown, the inner sleeve 15 and the outer sleeve 16 which are welded together and have a tapered bore to fit on shaft 1 at 1', 1'' and 1''' to facilitate replacement or repair. Liquid feed tubes 17 are inserted through sleeve 15 to annular liquid space 18 and each extends outwardly into the external closed end of a steam tube 19, as shown. Steam tubes 19 extend through sleeve 16 to annular vapor space 20 (Figs. 1 and 7). The liquid (water or mercury) enters through feed pipe 11, thence through radial openings 21 to annular liquid space 18, then outward radially through tubes 17, thence inward radially in the annular space between tubes 17 and 19 to the degree or extent the centrifugal force balances the vapor pressure in the annular space between tubes 17 and 19 and the annular space 20. From the annular space 20 the vapor then passes through super-heater tubes 22 into annular space 23 surrounding shaft 1, thence to rotating nozzles 24, thence through the multi-stage turbine B' to exhaust ring 25 and to steam outlet 26. The products of combustion enter the boiler at or near 2500° F., pass over tubes 19 and 22 and enter the gas turbine B at 1200° to 1300° F. and leave gas turbine through ring 27 at about 700° to 800° F. to exhaust outlet 28. It is to be noted that exhaust ring 27 almost completely surrounds steam turbine B', thereby reducing the drop in steam temperature therein by means of the gas turbine exhaust temperatures.

The tubes 17 and 19 may be threaded into the respective sleeves 15 and 16 to facilitate their assembly and their replacement.

Thermocouple 29 measures the temperature of the products of combustion entering the gas turbine and operates the proportioning control valve K which will be described later. Steam pressure gauge 30 indicates the steam pressure in nozzle chamber 31.

The axial compressor C (Figs. 1, 5 and 8), is similar to those now in general use which consists of a rotor 32' mounted on shaft 32, upper housing 33 and lower housing 34. Both housings are water cooled as shown. The air inlet is at 35 and air outlet at 36.

The electric generator E is any suitable type for generating electric power; its armature shaft 37 is coupled to compressor shaft 32 as shown in Fig. 1.

The economy of the installation is improved by the use of heat exchangers H, air precooler J and steam condenser G for stationary and marine installations where plenty of cooling water is available. Cooling water is supplied by conduit 38 which supplies water precooler J by conduit 39 and outlet 40, and axial compressor by conduit 41 and outlet 42 (Figs. 1 and 5). The compressed air from compressor outlet 36 passes through steam-air and gas-air heat exchangers H as shown through conduit 43 and enters inlet 6 of the unit A.

Fuel oil from oil tank 44s is preheated in coil 45' in steam exhaust conduit 46 between steam outlet 26 and steam condenser G. Oil conduit 45 enters pump 47, thence to proportioning control valve K; from control valve K oil conduit 48 is connected to oil manifold 5. The boiler water is supplied from condenser G through conduit 49 to pump 50, thence to control valve K, thence by conduit 51 to coil preheater 51' in the gas exhaust conduit 52, thence to feed pipe 11 by conduit 51. Condenser G is supplied with cooling water by conduit 52 and drain 53.

Proportioning control valve K has oil connections 44 and 48 and water connections 49 and 51 and consists of two balanced slide valves with valve 54 for water (or mercury) and valve 55 for fuel oil and hand control lever 56 which operates each of valves 54 and 55 together. The relative position of valves 54 and 55 control the temperature of the gases entering the gas turbine, i. e. the predetermined temperature of which is not to be exceeded. The relative position of valves 54 and 55 is determined by the position of lever 57 which is controlled by gear motor 58 and eccentric 59. Gear motor 58 is controlled by pyrometer 60 through control circuit 61—62—63. Pyrometer 60 is connected to thermo-couple 29 through wires 64 and 65. Power is supplied by wires 66 and 67, as shown. When the gas temperature increases above a predetermined value the fuel is reduced and water (or mercury) rate is increased, or vice versa.

In Fig. 8 I have illustrated a gas-mercury-vapor-steam prime mover installation having all the parts previously described, except that a mercury-steam generator F and a steam turbine D have been added. In the rotary boiler designed for the evaporation of mercury the proportions have to be adjusted to meet the increased weight of mercury over that of water as compared to the design shown in Fig. 2 and the rotational speed reduced. This arrangement has the advantage that only mercury is admitted to the rotary boiler, the vapor of which drives the mercury turbine (in this case B') and the vapor as discharged from turbine B' generates steam in the mercury-steam-generator F for steam turbine D. This arrangement has an advantage when treated water is unavailable and turbine D operates non-condensing as in a locomotive.

When the gas-mercury-vapor-steam turbine is used for ship propulsion where plenty of water is available, the preferred arrangement is as shown in Fig. 8.

In Fig. 8 conduit 52 carries the products of combustion from turbine B to heat exchanger H as shown. Conduit 43 carries the compressed air from compressor C through heat exchanger H, thence to unit A. Mercury feed line 51 passes through heating coils 51' and steam conduit 68 carries steam from unit F passing through heating coils 68' to steam turbine D. Mercury turbine B' discharges into unit F through conduit 46'. Heating coils 51' and 68' are in conduit 52, as shown. Turbine D discharges to steam condenser G through conduit 46 where the condenser water enters at 39 and is discharged at 40. Water is supplied to unit F from unit G through conduit 49 with pump 49'.

In Fig. 8 I have not shown control valve K for purpose of simplicity, but it can be used to control the supply of fuel oil and mercury to unit A. Provision can also be made to regulate the supply of water through conduit 49 from unit G to unit F.

In my invention the rotary boiler operates under higher temperature and is supercharged and capable of burning large quantities of fuel as compared with the conventional boiler operating at or near atmospheric pressure. In Fig. 9 curve 69—70—71 shows the estimated rate of evaporation of water at various firebox temperatures.

The conventional boiler operates on that portion of the curve between 69 and 70 whereas with the supercharged boiler will operate above point 70 on curve 69—70—71.

Other effective arrangements may be accomplished with the various principal parts of my invention. For example, Fig. 10 shows a gas turbine, a rotary boiler with combustor, a high pressure steam turbine B', a low pressure steam turbine D, a steam re-heater H' placed in the exhaust gas conduit 52, between steam turbines B' and D. Turbine D may be either condensing or non-condensing, as may be desired.

It will be seen by those skilled in the art that the gas-steam-turbine or gas-mercury vapor turbine with rotary boiler and combustor unit A—B—B' illustrated in Figs. 1, 2 and 3, is adaptable to several arrangements as described, and other possible arrangements to provide an effective prime mover using low cost fuels to produce power at a cost equal to or lower per horsepower-hour than any known heat engine.

The thermal efficiency of my invention may be further improved by the use of an ammonia absorption refrigerating apparatus so designed and proportioned to utilize the waste heat in conduit 46 or 52 to remove the heat of compression from the air in axial compressor C. This apparatus could be designed without any moving parts with the possible exception of a small circulating pump.

For starting or cranking the gas-vapor turbine an electric motor with an over-running clutch may be provided (not shown), or the starting may be executed by means of stored compressed air connected at 31' admitting air to chamber 31 thereby utilizing turbine B' for starting. Steam from an auxiliary boiler may also be used.

In the drawings I have not shown any speed control devices or overspeed protection as such devices are now in use on both gas and steam turbines which are suitable to use with my invention.

In the specification certain values are used for the purpose of explanation and are not limiting. Certain changes can be made from that shown in the specification and drawings without departing from the spirit of the invention.

I claim:

1. A power plant comprising a unitary assembly embodying a rotary shaft supported for rotation at the opposite ends of said assembly, a vapor generator, a gas turbine and a vapor turbine mounted in series in axial alignment on said shaft, a plurality of fuel burners at one end of said vapor generator directing combustion gases in a single direction through said vapor generator and gas turbine in series and towards said vapor turbine, and superheater tubes mounted on said shaft at the opposite end of said vapor generator for supplying superheated vapor to said vapor turbine which vapor also traverses the field of operation of said gas turbine along said shaft.

2. A power plant comprising a unitary assembly embodying a rotary shaft supported for rotation at the opposite ends of said assembly, a vapor generator, a gas turbine and a vapor turbine mounted in series in axial alignment on said shaft, a plurality of fuel burners at one end of said vapor generator directing combustion gases in a single direction through said vapor generator and gas turbine in series and towards said vapor turbine, superheater tubes mounted on said shaft at the opposite end of said vapor generator for supplying superheated vapor to said vapor turbine along said shaft, and a casing surrounding the power plant comprising a jacket around a major portion of said vapor turbine for receiving the combustion gases issuing from said gas turbine for reducing the heat loss in said vapor turbine.

3. A power plant as set forth in claim 1 including means for correlating the fuel supply and the quantity of vaporizable liquid fed to said vapor generator to maintain the gases coursing through said gas turbine at a safe operating temperature, comprising automatic thermostatically operated control means for increasing the fuel supply and reducing the liquid supply to increase the temperature of the combustion gases at the gas turbine and for reducing the fuel supply and increasing the liquid supply to reduce the temperature of the combustion gases thereat, and a thermostat for initiating said control being disposed in said assembly beyond said superheater tubes and at the inlet of said gas turbine for said combustion gases.

4. A power plant as set forth in claim 1 wherein the vapor generator comprises a sleeve surrounding the rotary shaft and spaced therefrom to provide an annular liquid chamber, a central bore in said shaft and at least one passage connected therebetween and said liquid chamber for introducing a vaporizable liquid thereinto, a second sleeve surrounding said first sleeve in spaced relation thereto to form an annular vapor chamber therebetween, a plurality of open-ended tubes extending radially from said first sleeve, a plurality of tubes extending radially from said second sleeve with an open end thereat and closed at the opposite end, each of said last-mentioned tubes surrounding and overlying one of said first-mentioned tubes and spaced therefrom to form passages for liquid through said first-mentioned tubes from said liquid chamber and for liquid and vapor mixtures through said other tubes to said vapor chamber, an annular heat exchange space surrounding said sleeves whereby all of said tubes are adapted to rotate in said space traversed by high temperature combustion gases tending to throw the liquid towards the closed ends of the second group of tubes wherefrom the vapor is separated for inward travel to said annular vapor chamber.

5. Apparatus as set forth in claim 4, wherein one end of each superheater tube is connected to said annular vapor chamber and the other end thereof communicates with the vapor turbine.

6. Apparatus as set forth in claim 4 wherein the concentric disposition of the first group of tubes within the second group of tubes is arranged to provide adequate space for the travel of the respective fluids and mixtures thereof and a balance between the centrifugal liquid and vapor forces and the generated vapor pressure.

7. Apparatus as set forth in claim 4 wherein the concentric disposition of the first group of tubes within the second group of tubes is arranged to provide adequate space for the travel of the respective fluids and mixtures thereof and a balance between the centrifugal liquid and vapor forces and the generated vapor pressure, said balance remaining constant for a predetermined rotary speed and vapor pressure, and said tubes being of limited length to cause no bending stresses therein.

8. A power plant comprising a unitary assembly embodying a rotary shaft supported for rotation at the opposite ends of said assembly, a vapor generator, a gas turbine and a vapor turbine mounted in series in axial alignment on said shaft, a plurality of fuel burners mounted in one end of said vapor generator, a fuel supply therefor, a compressor for supplying air under pressure to said burners also mounted on said rotary shaft whereby combustion gases course through said vapor generator in a single direction, means for introducing a vaporizable liquid to said vapor generator through said shaft, superheater tubes mounted on said shaft at the opposite end of said vapor generator for supplying superheated vapor to said vapor turbine along said shaft while extracting the heat from the combustion gases going through said gas turbine, heat exchangers for preheating the combustion air by the exhausting vapors and gases, a casing surrounding said vapor generator, and a heat insulating jacket on the interior of said casing provided with cooling tubes traversed by the compressed air from said compressor, said air adapted to be combined with the combustion gases in advance of said gas turbine.

9. A power plant comprising a unitary assembly embodying a rotary shaft supported for rotation at the opposite ends of said assembly, a mercury vapor generator, a gas turbine and a mercury vapor turbine mounted in series in axial alignment on said shaft, a plurality of fuel burners mounted in one end of said mercury vapor generator, a fuel supply therefor, a compressed air supply therefor, means for feeding mercury to said vapor generator through said shaft, superheater tubes mounted on said shaft at the opposite end of said vapor generator for supplying superheated mercury vapor to said vapor turbine while extracting the heat from the combustion gases prior to their entry into said gas turbine, a combination mercury condenser and steam generator connected to the outlet of said mercury vapor turbine, and a steam turbine mounted on said rotary shaft adapted to be driven by the generated steam.

EDWIN B. HUDSON.

REFERENCES CITED

The following references are of record in the file of this patent:

UNITED STATES PATENTS

| Number | Name | Date |
|---|---|---|
| 841,760 | Ball | Jan. 22, 1907 |
| 1,994,009 | Vorkauf | Mar. 12, 1935 |
| 2,012,967 | Meininghaus | Sept. 3, 1935 |
| 2,095,984 | Holzwarth | Oct. 19, 1937 |
| 2,140,175 | Starziczny | Dec. 13, 1938 |
| 2,152,479 | Hoffmann | Mar. 28, 1939 |
| 2,154,481 | Vorkauf | Apr. 18, 1939 |
| 2,169,601 | Cornelius et al. | Aug. 15, 1939 |
| 2,249,301 | Simmon | July 15, 1941 |

FOREIGN PATENTS

| Number | Country | Date |
|---|---|---|
| 14,311 | Great Britain | June 14, 1910 |
| 4,350 | Great Britain | Feb. 21, 1912 |
| 142,515 | Great Britain | May 13, 1920 |
| 410,257 | Great Britain | May 17, 1934 |
| 331,648 | Germany | Jan. 11, 1921 |
| 508,026 | Germany | Sept. 23, 1930 |